United States Patent [19]

Hioki et al.

[11] Patent Number: 5,514,533
[45] Date of Patent: May 7, 1996

[54] SILVER HALIDE PHOTOGRAPHIC PHOTOSENSITIVE MATERIALS AND A METHOD FOR THEIR PROCESSING

[75] Inventors: Takanori Hioki; Tetsuo Yoshida, both of Kanagawa, Japan

[73] Assignee: Fuji Photo Film Co., LTD., Kanagawa, Japan

[21] Appl. No.: 317,776

[22] Filed: Oct. 4, 1994

Related U.S. Application Data

[63] Continuation of Ser. No. 105,613, Aug. 13, 1993, abandoned.

[30] Foreign Application Priority Data

Aug. 27, 1992 [JP] Japan .................. 4-228747

[51] Int. Cl.$^6$ .................................................. G03C 1/10
[52] U.S. Cl. .................. 430/577; 430/573; 430/578; 430/579; 430/592; 430/603
[58] Field of Search .................... 430/575, 579, 430/573, 578, 577, 585, 600, 603, 608, 601, 610, 963, 427, 592

[56] References Cited

U.S. PATENT DOCUMENTS

| | | | |
|---|---|---|---|
| 3,706,570 | 12/1972 | Nakazawa et al. | 430/578 |
| 3,971,664 | 7/1976 | Nakazawa | 430/578 |
| 4,920,040 | 4/1990 | Ono | 430/363 |
| 5,021,326 | 6/1991 | Meckl et al. | 430/399 |
| 5,112,731 | 5/1992 | Miyasaka | 430/592 |
| 5,215,880 | 6/1993 | Kojima et al. | 430/608 |
| 5,234,806 | 8/1993 | Kaneko et al. | 430/578 |
| 5,238,807 | 8/1993 | Sasaki et al. | 430/600 |
| 5,348,850 | 9/1994 | Toshida | 430/575 |

*Primary Examiner*—Thorl Chea
*Attorney, Agent, or Firm*—Sughrue, Mion, Zinn, Macpeak & Seas

[57] ABSTRACT

A silver halide photographic photosensitive material comprises a silver halide photographic emulsion layer and a compound represented by general formula (I):

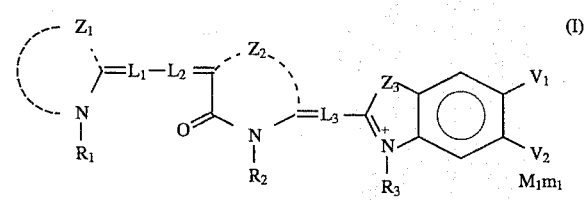

wherein $V_1$ and $V_2$ each represents a hydrogen atom, an alkyl group or an alkoxy group; at least one of $V_1$ and $V_2$ is an alkyl group or an alkoxy group; $Z_1$ represents a group of atoms which is required to form a five- or six-membered nitrogen-containing heterocyclic ring; $Z_2$ represents a group of atoms which is required to form a five- or six-membered nitrogen-containing heterocyclic ring; $Z_3$ represents an oxygen atom, a sulfur atom or a selenium atom; $R_1$ and $R_3$ each represents an alkyl group; $R_2$ represents an alkyl group, an aryl group or a heterocyclic group; $L_1$, $L_2$ and $L_3$ each represents a methine group; $M_1$ represents a charge neutralizing counter-ion; and $m_1$ is a number having a value zero or above which is required to neutralize the charge within the molecule.

7 Claims, No Drawings

SILVER HALIDE PHOTOGRAPHIC PHOTOSENSITIVE MATERIALS AND A METHOD FOR THEIR PROCESSING

This is a Continuation of application Ser. No. 08/105,613 filed Aug. 13, 1993, now abandoned.

FIELD OF THE INVENTION

This invention concerns silver halide photographic photosensitive materials which have a high photographic speed and good keeping quality. More precisely, it concerns silver halide photographic photosensitive materials which have a high photographic speed, a high contrast with respect to short time exposures to an He—Ne light source, and good keeping quality. Furthermore, the invention concerns photosensitive materials which are superior in their capacity to permit reduction of the rate of replenishment of the processing liquids and their suitability for rapid processing, and to a method for processing such materials.

BACKGROUND OF THE INVENTION

Scanner systems have been widely used in recent years in the printing field. Various light sources have been used in practice in recording apparatuses for image forming purposes in which a scanner system is employed. Of these, the He—Ne laser is superior in terms of stability and image quality, and it is widely used. The exposure time is short at $10^{-3}$ to $10^{-7}$ seconds per scanning exposure, and so the photosensitive materials which are used must have a high photographic speed and a high contrast, even with such a short exposure time.

Moreover, a demand has arisen in the printing industry in recent years for speeding-up operation and increasing efficiency, and higher speed scanning and more rapid processing of the photosensitive materials are very desirable. Furthermore, reductions in the amounts of developer and fixer which are used for processing is desirable from the viewpoints of storage and waste-recovery costs and from the viewpoint of environmental problems, and there are high expectations of reductions being made in rates of replenishment.

Photosensitive materials which contain carbocyanine or rhodacyanine spectrally sensitizing dyes and in which the gelatin content of the emulsion and the protective layers is specified have been disclosed in JP-A-3-59637 as such sensitive materials suitable for rapid processing and an He—Ne light source. (The term "JP-A" as used herein signifies an "unexamined published Japanese patent application".) Furthermore, silver chlorobromide emulsions which contain iridium and rhodium and which have been gold/sulfur sensitized are disclosed in the illustrative examples of that reference. However, although the results are satisfactory in terms of gradation and residual coloration with the abovementioned materials, the photographic speed is low, and satisfactory stability of photographic properties under conditions of a reduced rate of replenishment of the processing liquids has not yet been achieved.

Furthermore, silver halide photosensitive materials which contain water soluble iridium compounds have been disclosed in JP-B-57-22090. (The term "JP-B" as used herein signifies an "examined Japanese patent publication".) However, there are no known cases in which a rhodacyanine which has a specified structure like that in the present invention is used.

SUMMARY OF THE INVENTION

Hence, an object of the present invention is to provide a silver halide photographic photosensitive material which preferably has a high photographic speed with respect to an He—Ne laser light source, which has a high contrast, and which has good keeping quality.

Another object of the invention is to provide a photosensitive material whose photographic performance is stable even though the rate of replenishment of the processing liquids is reduced and a method for processing them.

Another object of the invention is to provide photosensitive materials with which rapid processing is possible, and a method for processing them.

The term "rapid processing" signifies processing in which the time from inserting the leading end of the film into an automatic processor until the leading end of the film emerges from the drying part after having passed through the developing bath, a transfer part, the fixing bath, another transfer part, the water washing bath and the drying part is 15 to 60 seconds.

These and other objects of the present invention have been realized by means of a silver halide photographic photosensitive material which contains at least one compound represented by the following general formula (I), and a silver halide photographic emulsion layer which preferably contains iridium:

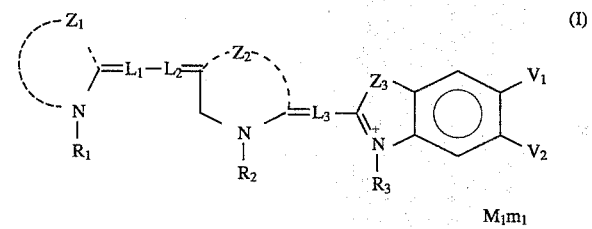

In this formula, $V_1$ and $V_2$ each represents a hydrogen atom, an alkyl group or an alkoxy group. Moreover, at least one of $V_1$ and $V_2$ is an alkyl group or an alkoxy group.

$Z_1$ represents a group of atoms which is required to form a five- or six-membered nitrogen-containing heterocyclic ring. $Z_2$ represents a group of atoms which is required to form a five- or six-membered nitrogen-containing heterocyclic ring. $Z_3$ represents an oxygen atom, a sulfur atom or a selenium atom.

$R_1$ and $R_3$ each represents an alkyl group.

$R_2$ represents an alkyl group, an aryl group or a heterocyclic group.

$L_1$, $L_2$ and $L_3$ each represents a methine group.

$M_1$ represents a charge neutralizing counter-ion, and $m_1$ is a number having a value zero or above which is required to neutralize the charge within the molecule.

DETAILED DESCRIPTION OF THE INVENTION

The compounds represented by general formula (I) are described in detail below.

The nucleus formed by $Z_1$ may be a thiazole nucleus {a thiazole nucleus (for example, thiazole, 4-methylthiazole, 4-phenylthiazole, 4,5-dimethylthiazole, 4,5-diphenylthiazole), a benzothiazole nucleus (for example, benzothiazole, 4-chlorobenzothiazole, 5-chlorobenzothiazole, 6-chlorobenzothiazole, 5-nitrobenzothiazole, 4-methylbenzothiazole, 5-methylthiobenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 6-methylthiobenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethylthiobenzothiazole, 5,6-dimethoxybenzothiazole, 5-hydroxy-6-methylbenzothiazole, tetrahydrobenzothiazole, 4-phenylbenzothiazole), a naphthothiazole nucleus (for example, naphtho[2,1-d]thiazole, naphtho[1,2-d]thiazole, naphtho[ 2,3-d]thiazole, 5-methoxynaphtho[1,2-d]thiazole, 7-ethoxynaphtho[ 2,1-d]thiazole, 8-methoxynaphtho[2,1-d] thiazole, 5-methoxynaphtho[2,3-d]thiazole)}, a thiazoline nucleus (for example, thiazoline, 4-methylthiazoline, 4-nitrothiazoline), an oxazole nucleus {an oxazole nucleus (for example, oxazole, 4-methyloxazole, 4-nitrooxazole, 5-methyloxazole, 4-phenyloxazole, 4,5-diphenyloxazole, 4-ethyloxazole), a benzoxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole), a naphthoxazole nucleus (for example, naphtho[2,1-d]oxazole, naphtho[1,2-d]oxazole, naphtho[ 2,3-d]oxazole, 5-nitronaphtho[2,1-d] oxazole)}, an oxazoline nucleus (for example, 4,4-dimethyloxazoline) a selenazole nucleus {a selenazole nucleus (for example, 4-methylselenazole, 4-nitroselenazole, 4-phenylselenazole), a benzoselenazole nucleus (for example, benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole), a naphthoselenazole nucleus ( for example, naphtho[2,1-d] selenazole, naphtho[1,2-d]selenazole)}, a selenazoline nucleus (for example, selenazoline, 4-methylselenazoline), a tellurazole nucleus {a tellurazole nucleus (for example, tellurazole, 4-methyltellurazole, 4-phenyltellurazole), a benzotellurazole nucleus (for example, benzotellurazole, 5-chlorobenzotellurazole, 5-methylbenzotellurazole, 5,6-dimethylbenzotellurazole, 6-methoxybenzotellurazole), a naphthotellurazole nucleus (for example, naphtho[2,1-d]tellurazole, naphtho[1,2-d]tellurazole)} , a tellurazoline nucleus (for example, tellurazoline, 4-methyltellurazoline), a 3,3-dialkylindolenine nucleus (for example, 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3-dimethyl-5-chloroindolenine), an imidazole nucleus {an imidazole nucleus (for example, 1-alkylimidazole, 1-alkyl-4-phenylimidazole, 1-arylimidazole), a benzimidazole nucleus (for example, 1-alkylbenzimidazole, 1-alkyl-5-chlorobenzimidazole, 1-alkyl- 5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl- 6-chloro-5-trifluoromethylbenzimidazole, 1-allyl- 5,6-dichlorobenzimidazole, 1-allyl-5-chlorobenzimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole), a naphthimidazole nucleus (for example, alkylnaphtho[1,2-d] imidazole, 1-arylnaphtho [1,2-d]imidazole), the alkyl groups referred to above having from 1 to 8 carbon atoms, being preferably unsubstituted alkyl groups (for example, methyl, ethyl, propyl, isopropyl, butyl) or hydroxyalkyl groups (for example 2-hydroxyethyl, 3-hydroxypropyl), and of these methyl group and ethyl group being especially desirable, and the aryl groups referred to above being phenyl groups, halogen (for example, chloro) substituted phenyl groups, alkyl (for example, methyl) substituted phenyl groups or alkoxy (for example, methoxy) substituted phenyl groups)}, a pyridine nucleus (for example, 2-pyridine, 5-methyl-2-pyridine), a quinoline nucleus {a quinoline nucleus (for example, 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline), an isoquinoline nucleus (for example, 6-nitro-1-isoquinoline, 3,4-dihydro- 1-isoquinoline, 6-nitro-3-isoquinoline)}, an imidazo[4,5-b]-quinoxaline nucleus (for example, 1,3-diethylimidazo[4,5-b]quinoxaline, 6-chloro-1,3-diallylimidazo[4,5-b]-quinoxaline), an oxadiazole nucleus, a thiadiazole nucleus, a tetrazole nucleus or a pyrimidine nucleus.

The nucleus formed by $Z_1$ is preferably a thiazole nucleus, a benzothiazole nucleus, a naphthothiazole nucleus, an oxazole nucleus, a benzoxazole nucleus, a naphthoxazole nucleus, a 2-pyridine nucleus, a 2-quinoline nucleus or a benzimidazole nucleus. It is most desirably a thiazole nucleus.

The five- or six-membered ring formed by $Z_2$ is a ring in which an oxo or thioxo group at an appropriate position has been removed from an acidic nucleus.

Here, an "acidic nucleus" is a nucleus as defined for example by James on page 198 of *The Theory of the Photographic Process,* 4th Edition, published by Macmillan, 1977.

In practice, the nuclei disclosed, for example, in U.S. Pat. Nos. 3,567,719, 3,575,869, 3,804,634, 3,837,862, 4,002,480 and 4,925,777, and JP-A-3-167546 can be cited as the nucleus formed by $Z_2$.

The following nuclei can be cited as preferred nuclei formed by $Z_2$: 2-pyrazolin-5-one, pyrazolidin-3,5-dione, imidazolin-5-one, hydantoin, 2- or 4-thiohydantoin, 2-iminooxazolidin-4-one, 2-oxazolin-5-one, 2-thiooxazolidin-2, 4-dione, isooxazolin-5-one, 2-thiazolin-4-one, thiazolidin-4-one, thiazolidin-2,4-dione, rhodanine, thiazolidin-2,4-dithione, isorhodanine, indan-1,3-dione, thiophen-3-one, thiophen-3-one-1,1-dioxide, indolin-2-one, indolin-3-one, indazolin-3-one, 2-oxoindazolinium, 3-oxoindazolinium, 5,7-dioxo-6,7-dihydrothiazolo[3,2-a]pyrimidine, cyclohexan-1,3-dione, 3,4-dihydroisoquinolin-4-one, 1,3-dioxan-4,4-dione, barbituric acid, 2-thiobarbituric acid, chroman-2, 4-dione, indazolin-2-one or pyrido[1,2-a] pyrimidin-1,3-dione nuclei. 3-Alkylrhodanine, 3-alkyl- 2-thiooxazolidin-2,4-dione and 3-alkyl-2-thiohydantoin are more desirable. 3-Alkylrhodanine is especially desirable.

$L_1$, $L_2$ and $L_3$ represent unsubstituted methine groups or substituted methine groups {for example, methine groups substituted with substituted or unsubstituted alkyl groups (for example, methyl, ethyl, 2-carboxyethyl), substituted or unsubstituted aryl groups (for example, phenyl, o-carboxyphenyl), heterocyclic groups (for example, barbituric acid), halogen atoms (for example, chlorine, bromine), alkoxy groups (for example, methoxy, ethoxy), amino groups (for example, N,N-diphenylamino, N-methyl-N-phenylamino, N-methylpiperazino), and alkylthio groups (for example, methylthio, ethylthio, etc.), and they can also form rings with auxochromes. $L_1$ and $L_3$ preferably represent unsubstituted methine groups. $L_2$ preferably represents unsubstituted methine groups or alkyl (for example, methyl) substituted methine groups.

$M_1$ and $m_1$ are included in the formula to indicate the presence or absence of a cation or an anion which is required to neutralize the ionic charge of the dye. Whether a certain dye is cationic or anionic, or whether it has a net ionic charge, depends on the auxochrome and the substituent groups. The inorganic or organic ammonium ions and alkali metal ions are typical cations, while the anions may typically be either inorganic anions or organic anions. Examples include halogen anions (for example, fluorine ion, chlorine ion, bromine ion, iodine ion), substituted arylsulfonic acid anions (for example, p-toluenesulfonic acid ion, p-chlorobenzenesulfonic acid ion), aryldisulfonic acid ions (for example, 1,3-benzenedisulfonic acid ion, 1,5-naphthalenedisulfonic acid ion, 2,6-naphthalenedisulfonic acid ion), alkyl sulfate ions (for example, methyl sulfate ion), sulfuric acid ion, thiocyanic acid ion, perchloric acid ion, tetrafluoroboric acid ion, picric acid ion, acetic acid ion and trifluoromethanesulfonic acid ion. The ammonium ion, the iodine ion and the p-toluenesulfonic acid ion are preferred.

$R_1$ and $R_3$ are preferably unsubstituted alkyl groups which have 1 to 18 carbon atoms (for example, methyl, ethyl, propyl, butyl, pentyl, octyl, decyl, dodecyl, octadecyl) or substituted alkyl groups which have 1 to 18 carbon atoms {which are substituted with, for example, carboxyl groups, sulfo groups, cyano groups, halogen atoms (for example, fluorine, chlorine, bromine), hydroxy groups, alkoxycarbonyl groups which have 2 to 8 carbon atoms (for example, methoxycarbonyl, ethoxycarbonyl, benzyloxycarbonyl), aryloxycarbonyl groups which have 7 to 11 carbon atoms (for example, phenoxycarbonyl), alkoxy groups which have 1 to 8 carbon atoms (for example, methoxy, ethoxy, benzyloxy, phenethyloxy), monocyclic aryloxy groups which have 6 to 10 carbon atoms (for example, phenoxy, p-tolyloxy), acyloxy groups which have 1 to 3 carbon atoms (for example, acetoxy, propionyloxy), acyl groups which have 1 to 8 carbon atoms (for example, acetyl, propionyl, benzoyl, mesyl), carbamoyl groups (for example, carbamoyl, N,N-dimethylcarbamoyl, morpholinocarbonyl, piperidinocarbonyl), sulfamoyl groups (for example, sulfamoyl, N, N-dimethylsulfamoyl, morpholinosulfonyl, piperidinosulfonyl), and aryl groups which have 6 to 10 carbon atoms (for example, phenyl, 4-chlorophenyl, 4-methylphenyl, α-naphthyl)}. Unsubstituted alkyl groups (for example, methyl, ethyl, n-propyl, n-butyl, n-pentyl, iso-pentyl, n-hexyl), carboxyalkyl groups (for example, 2-carboxyethyl, carboxymethyl), sulfoalkyl groups (for example, 2-sulfoethyl, 3-sulfopropyl, 4-sulfobutyl, 3-sulfobutyl), and the methanesulfonylcarbamoylmethyl group are more preferred.

$R_2$ is preferably an alkyl group which has from 1 to 18, preferably from 1 to 7, and most desirably from 1 to 4, carbon atoms (for example, methyl, ethyl, propyl, isopropyl, butyl, isobutyl, hexyl, octyl, dodecyl, octadecyl), a substituted alkyl group {for example, an aralkyl group (for example, benzyl, 2-phenylethyl), a hydroxyalkyl group (for example, 2-hydroxyethyl, 3-hydroxypropyl), a carboxyalkyl group (for example, 2-carboxyethyl, 3-carboxypropyl, 4-carboxybutyl, carboxymethyl), an alkoxyalkyl group (for example, 2-methoxyethyl, 2-(2-methoxyethoxy)ethyl), a sulfoalkyl group (for example, 2-sulfoethyl, 3-sulfopropyl, 3-sulfobutyl, 4-sulfobutyl, 2-[3-sulfopropoxy]ethyl, 2-hyroxy-3-sulfopropyl, 3-sulfopropoxyethoxyethyl), a sulfatoalkyl group (for example, 3-sulfatopropyl, 4-sulfatobutyl), a heterocyclic substituted alkyl group (for example, 2-pyrrolidin-2-one-1-yl)ethyl, tetrahydrofurfuryl, 2-morpholinoethyl), a 2-acetoxyethyl group, a carbomethoxymethyl group, a 2-methanesulfonylaminoethyl group}, an allyl group, an aryl group (for example, phenyl, 2-naphthyl), a substituted aryl group (for example, 4-carboxyphenyl, 4-sulfophenyl, 3-chlorophenyl, 3-methylphenyl), or a heterocyclic group (for example, 2-pyridyl, 2-thiazolyl). Unsubstituted alkyl groups (for example, methyl, ethyl, n-propyl, n-butyl, n-pentyl, n-hexyl), carboxyalkyl groups (for example, carboxymethyl, 2-carboxyethyl), and sulfoalkyl groups (for example, 2-sulfoethyl) are especially desirable.

Preferred as $V_1$ and $V_2$ are hydrogen atoms, unsubstituted alkyl groups which have 1 to 5 carbon atoms (for example, methyl, ethyl, propyl, butyl, pentyl), substituted alkyl groups which have 1 to 14 carbon atoms which are substituted with, for example, carboxy groups, sulfo groups, cyano groups, halogen atoms (for example, fluorine, chlorine, bromine), hydroxy groups, alkoxycarbonyl groups which have 2 to 10 carbon atoms (for example, methoxycarbonyl, ethoxycarbonyl, phenoxycarbonyl, benzyloxycarbonyl), alkoxy groups which have 1 to 4 carbon atoms (for example, methoxy, ethoxy, benzyloxy, phenethyloxy), monocyclic aryloxy groups which have 6 to 10 carbon atoms (for example, phenoxy, p-tolyloxy), acyloxy groups which have 1 to 3 carbon atoms (for example, acetyloxy, propionyloxy), acyl groups which have 1 to 4 carbon atoms (for example, acetyl, propionyl, benzoyl, mesyl), carbamoyl groups (for example, carbamoyl, N,N-dimethylcarbamoyl, morpholinocarbonyl, piperidinocarbonyl), sulfamoyl groups (for example, sulfamoyl, N,N-dimethylsulfamoyl, morpholinosulfonyl, piperidinosulfonyl), or aryl groups which have 6 to 10 carbon atoms (for example, phenyl, 4-chlorophenyl, 4-methylphenyl, α-naphthyl)}, unsubstituted alkoxy groups which have 1 to 5 carbon atoms (for example, methoxy, ethoxy), and substituted alkoxy groups (for example, those which are substituted with the substituent groups described above in connection with the substituted alkyl groups). Moreover, those cases in which $V_1$ and $V_2$ are alkyl groups or alkoxy groups are preferred. Furthermore, those cases in which $V_1=V_2$ are preferred. Moreover, unsubstituted alkyl groups and unsubstituted alkoxy groups are preferred for the alkyl groups and alkoxy groups, and those cases in which $V_1=V_2=$ an unsubstituted methyl group or $V_1=V_2=$an unsubstituted methoxy group are especially desirable.

Representative examples of compounds which can be represented by general formula (I) are indicated below, but the invention is not limited to these examples:

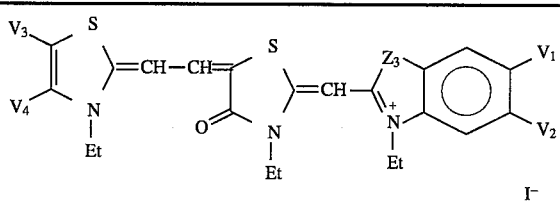

| Compound No. | $V_3$ | $V_4$ | $V_1$ | $V_2$ | $Z_3$ |
|---|---|---|---|---|---|
| (I-1) | H | Me | H | Me | S |
| (I-2) | H | Me | H | OMe | S |
| (I-3) | H | Me | OMe | Me | S |
| (I-4) | H | Me | Me | Me | S |
| (I-5) | H | Me | OMe | OMe | S |
| (I-6) | Me | Me | OMe | OMe | S |
| (I-7) | $-(CH_2)_4-$ | | OMe | OMe | S |
| (I-8) | H | Me | Me | H | O |
| (I-9) | H | Me | OMe | H | O |
| (I-10) | H | Me | Me | OMe | O |
| (I-11) | H | Me | OMe | OMe | O |
| (I-12) | H | Me | Me | Me | O |
| (I-13) | Me | Me | Me | Me | O |
| (I-14) | $-(CH_2)_4-$ | | Me | Me | O |
| (I-15) | H | Me | Me | Me | Se |
| (I-16) | H | Me | OMe | OMe | Se |

$Me = CH_3$

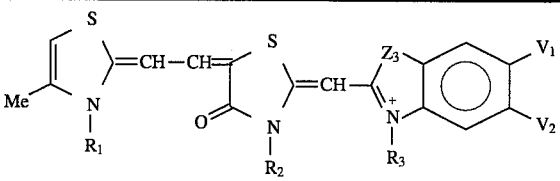

| Compound No. | $R_1$ | $R_2$ | $R_3$ | $Z_3$ | $V_1 = V_2$ | $M_1$ | $m_1$ |
|---|---|---|---|---|---|---|---|
| (I-17) | Et | Et | $(CH_2)_4SO_3^-$ | S | Me | — | — |
| (I-18) | Et | Me | $CH_2CO_2H$ | S | OMe | $I^-$ | 1 |
| (I-19) | Me | Ph | $CH_2CON^\ominus SO_2Me$ | S | Me | — | — |
| (I-20) | $(CH_2)_4SO_3^-$ | Et | $(CH_2)_4Me$ | S | Et | — | — |
| (I-21) | Et | $CH_2CO_2H$ | Et | S | OEt | $Br^-$ | 1 |
| (I-22) | $(CH_2)_4SO_3^-$ | Et | $(CH_2)_4SO_3^-$ | O | Me | $Na^+$ | 1 |
| (I-23) | $(CH_2)_3Me$ | $CH_2CH=CH_2$ | $(CH_2)_2OMe$ | O | OMe | $Br^-$ | 1 |
| (I-24) | $(CH_2)_2OH$ | $(CH_2)_2OH$ | $(CH_2)_2OH$ | O | Me | $I^-$ | 1 |
| (I-25) | Et | $(CH_2)_2NHCMe$ (C=O) | Et | O | Me | $I^-$ | 1 |
| (I-26) | Me | $CH_2CO_2H$ | Et | O | Me | $I^-$ | 1 |
| (I-27) | Et | Et | $(CH_2)_4SO_3^-$ | Se | Me | — | — |
| (I-28) | Et | $(CH_2)_2SO_3^-$ | $(CH_2)_2CO_2H$ | Se | OMe | — | — |

$Et = C_2H_5$

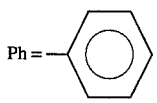

(I-29)

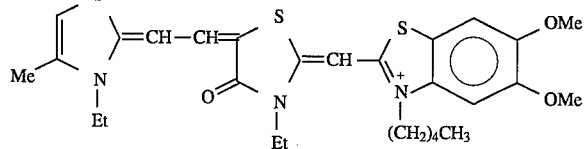

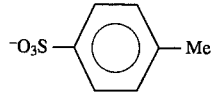

(I-30) 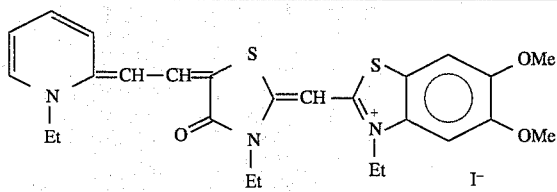

(I-31) 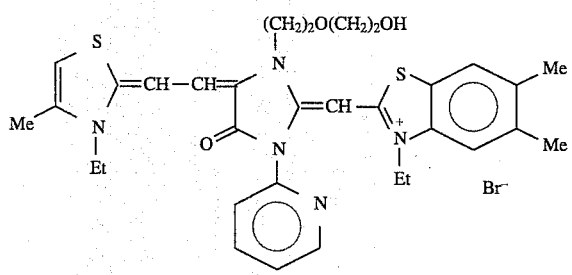

(I-32) 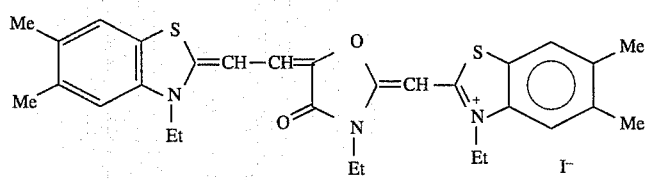

(I-33) 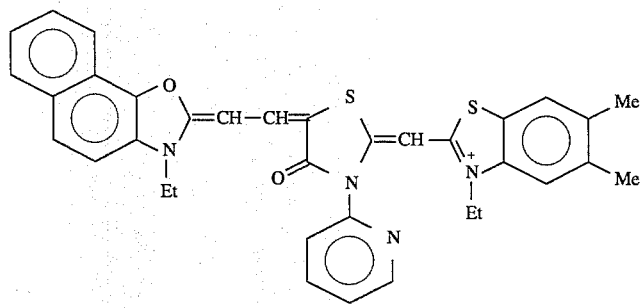

(I-34) 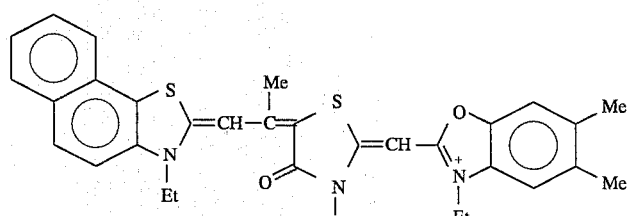

Compounds represented by general formula (I) can be prepared on the basis of the methods disclosed, for example, by F. M. Hamer in *Heterocyclic Compounds—Cyanine Dyes and Related Compounds,* published by John Wiley & Sons, New York, London, 1964, by D. M. Sturmer in *Heterocyclic Compounds—Special Topics in Heterocyclic Chemistry,* Chapter 18, Section 14, pages 482 to 515, published by John Wiley & Sons, New York, London, 1977, and in *Rodd's Chemistry of Carbon Compounds* (2nd Ed., Vol. IV, part B, published 1977), Chapter 15, pages 369 to 422 and (2nd Ed., Vol. IV, Part B, published 1985), Chapter 15, pages 267 to 296 (Published by Elsvier Science Publishing Company Inc., New York). An example of synthesis is indicated below:

Scheme 1

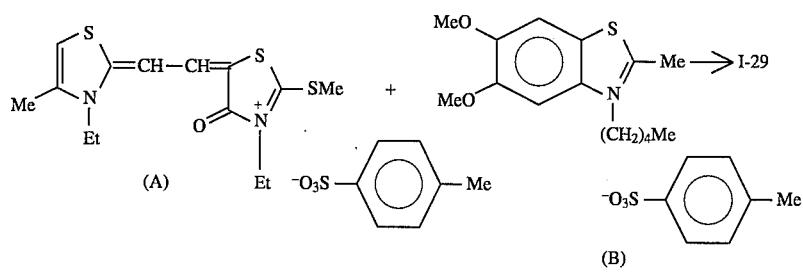

Triethylamine (6 ml) was added to 7 grams of (A), 6.3 grams of (B) and 140 ml of acetonitrile and the mixture was stirred for 1 hour at an external temperature of 60° C. The crystals which precipitated out were recovered by suction filtration, 250 ml of methanol were added to the crystals so obtained, and the crystals were dissolved completely by heating under reflux. After natural filtration, 450 ml of ethyl acetate were added to the filtrate. The crystals which precipitated out were recovered by suction filtration and, after drying, violet crystals of I-29 were obtained (4.8 grams, yield 47%, mp=297° to 298° C., $\lambda_{max}$ methanol)=609 nm, absorbance coefficient $\epsilon=1.03\times10^5$).

The compounds represented by general formula (I) are preferably used as sensitizing dyes, but the dyes disclosed for example by F. M. Harmer in *Heterocyclic Compounds— Cyanine Dyes and Related Compounds* (John Wiley & Sons, New York, London, 1964) can be cited as sensitizing dyes which can be used conjointly in addition to the dyes of formula (I).

Useful sensitizing dyes, combinations of dyes which exhibit supersensitization, and substances which exhibit supersensitization, have been disclosed, for example, in *Research Disclosure* Vol.176, 17643 (published December 1978), page 23, section IV-J, and in JP-B-49-25500, JP-B-43-4933, JP-A-59-19032 and JP-A-59- 192242.

The compounds represented by general formula (I) of the present invention (and other sensitizing dyes which can be used conjointly) may be dispersed directly into the emulsion for inclusion in a silver halide emulsion as sensitizing dyes. Or they may be dissolved in a solvent such as water, methanol, ethanol, propanol, acetone, methylcellosolve, 2,2, 3,3-tetrafluoropropanol, 2,2,2-trifluroethanol, 3-methoxy-1-propanol, 3-methoxy- 1-butanol, 1-methoxy-2-propanol or N,N-dimethylformamide for example, either as an individual solvent or as a solvent mixture, and the solution can be added to the emulsion.

Furthermore, one may employ the methods in which the dye is dissolved in a volatile organic solvent, the solution is dispersed in water or a hydrophilic colloid and this dispersion is added to the emulsion, as disclosed, for example, in U.S. Pat. No. 3,469,987, the methods in which a water insoluble dye is dispersed in a water soluble solvent in which it does not dissolve and this dispersion is added to the emulsion, as disclosed, for example, in JP-B-46-24185, the methods in which the dye is dissolved in acid and that solution is added to the emulsion or it is formed into an aqueous solution in the presence of acid or base and added to the emulsion, as disclosed, for example, in JP-B-44-23389, JP-B-44- 27555 and JP-B-57-22091, the methods in which an aqueous solution or colloidal dispersion is formed in the presence of a surfactant and this is added to the emulsion, as disclosed, for example, in U.S. Pat. Nos. 3,822,135 and 4,006,026, the methods in which the dye is dispersed directly into a hydrophilic colloid and the dispersion is added to the emulsion as disclosed in JP-A-53-102733 and JP-A-58-105141, and the methods in which the dye is dissolved using a red-shifted compound and that solution is added to the emulsion, as disclosed in JP-A-51-74624, for example.

Furthermore, ultrasonics can be employed for the purpose of dissolution.

The time at which the sensitizing dyes used in the present invention are added to a silver halide emulsion of the present invention may be at any stage during the preparation of the emulsion which has been recognized in the past as being useful. For example, the addition may be made before coating the emulsion either during the formation of the silver halide grains or/and before de-salting, during the de-salting process and/or during the period after de-salting and before the commencement of chemical ripening, as disclosed, for example, in U.S. Pat. Nos. 2,735,766, 3,628,960, 4,183,756 and 4,225,666, JP-58-184142 and JP-A-60-196749, or at a time immediately before or during chemical sensitization, or at any time after chemical sensitization before coating, as disclosed, for example, in JP-A-58-113920. Furthermore, a divided addition may be made, adding the same compound individually or in combination with a compound which has a different structure, for example with addition during grain formation and during chemical sensitization or after the completion of chemical sensitization, or before or during chemical sensitization and after the completion of chemical sensitization, as disclosed in U.S. Pat. No. 4,225,666 and JP-A-58-7629, and the addition can be made with the divided addition of a compound or by varying the type of combination of compounds.

The amount of the sensitizing dyes used in the invention which is added differs according to the form and size of the silver halide grains, but the use of an amount of from $4\times10^{-8}$ mol to $8\times10^{-2}$ mol per mol of silver halide is preferred.

The constitution of the photographic material of the present invention is described below.

The silver halide emulsions which are used in the invention comprise silver chlorobromide or silver iodochlorobromide which contains at least 50 mol %, and preferably at least 70 mol %, silver chloride. The silver iodide content is preferably not more than 2 mol %.

The average grain size of the silver halide used in the invention is preferably small (for example, not more than 0.7 µm), and it is most desirably not more than 0.5 µm.

The form of the silver halide grains used in the invention may be cubic, octahedral, tetradecahedral, plate-like or spherical, or it may consist of a mixture of a variety of these forms, but cubic, tetradecahedral and tabular gains are preferred.

The grain size distribution is preferably monodisperse.

Here, the term "monodisperse" signifies a silver halide emulsion which has a grain size distribution of which the variation coefficient is not more than 20%, and preferably not more than 15%. Here the variation coefficient (%) is the value obtained by multiplying by 100 the value obtained by dividing the standard deviation of the grain size by the average grain size.

The silver halide grains which are used in the present invention can be prepared by the methods described, for example, by P. Glafkides in *Chemie et Physique Photographique* (Paul Montel, 1967), by G. F. Duffin in *Photographic Emulsion Chemistry* (The Focal Press, 1966), and by V. L. Zelikman et al. in *Making and Coating Photographic Emulsion* (The Focal Press, 1964).

That is to say, they can be prepared by the acidic method, the neutral method or the ammonia method for example. Single jet method, double jet method and any combinations of these methods can be used for carrying out the reaction between the soluble silver salt and a soluble halogen salt.

The methods in which the grains are formed in the presence of an excess of silver ion (the so-called reverse mixing methods) can also be used. The method in which the pAg value in the liquid phase in which the silver halide is being formed is held constant, the so-called controlled double jet method, can also be used as a means of double jet method.

If this method is used, a silver halide emulsion of regular grains in which the grain size approaches uniformity can be obtained.

Furthermore, methods in which the rates of addition of the silver nitrate and alkali halide are varied according to the grain growth rate, as disclosed in British Patent 1,535,016, JP-B-48-36890 and JP-B-52- 16364, and methods in which the concentration of the aqueous solutions is changed in the range not exceeding critical saturation to thereby make the grain grow rapidly, as disclosed in British Patent 4,242,445 and JP-A-55-158124, are preferred, in order to make the grain size uniform.

The silver halide grains may have a halogen composition such that the interior part and the surface layer are different, which is to say that they may have a so-called core/shell structure.

The known forms of rhodium, ruthenium and rhenium can be used in the present invention, but the use of water soluble complex salts is especially convenient. These metals differ greatly in nature according to the ligands of the complex, as disclosed in JP-A-2-20852 and JP-A-2-20853. In the present invention, they are used for the purpose of increasing contrast, and the inclusion of halogen and water molecules as ligands and the inclusion of nitrosyl and thionitrosyl ligands as disclosed in JP-A-2-20852 is desirable. In this case, the counter-ion is of no importance, and ammonium or alkali metal ions can be used. Examples of metal complexes which can be used in the present invention are indicated below:

| | | |
|---|---|---|
| $[RhCl_6]^{-3}$ | $[RhCl_5(H_2O)]^{-2}$ | $[RhBr_6]^{-3}$ |
| $[RhCl_5(NS)]^{-2}$ | $[RhCl_5(NO)]^{-2}$ | $[Rh(CN)_5(H_2O)]^{-2}$ |
| $[RhF_6]^{-3}$ | $[Rh(NO)Cl(CN)_4]^{-2}$ | |
| $[ReCl_6]^{-3}$ | $[Re(NO)(CN)_5]^{-2}$ | $[Re(NO)Cl_5]^{-2}$ |
| $[ReBr_6]^{-3}$ | $[ReCl_5(NS)]^{-2}$ | $[Re(CN)_5(H_2O)]^{-2}$ |
| $[Ru(NO)(CN)_5]^{-2}$ | $[Ru(NO)Cl_5]^{-2}$ | $[RuBr_6]^{-3}$ |
| $[RuCl_5(NS)]^{-2}$ | $[Ru(CN)_5(H_2O)]^{-2}$ | |

These metal compounds can be used by dissolution in water or an appropriate solvent, but the methods frequently used for stabilizing the solutions, which is to say the methods in which aqueous hydrogen halide solutions (for example, hydrochloric acid, hydrobromic acid, hydrofluoric acid) or alkali halides (for example, KCl, NaCl, KBr, NaBr) are added, can be used. Separate silver halide grains which have been pre-doped with the metal during the preparation of the silver halide grains can also be added and dissolved instead of using a water soluble salt.

The total amount of metal compound added in the present invention is suitably from $5\times10^{-9}$ to $1\times10^{-4}$ mol, preferably from $1\times10^{-8}$ to $1\times10^{-6}$ mol, and most desirably from $5\times10^{-8}$ to $5\times10^{-7}$ mol, per mol of the silver halide which is formed ultimately.

The addition of these compounds can be made suitably at any stage during the preparation of the silver halide emulsion and before the emulsion is coated, but the addition during grain formation and incorporation within the silver halide grains are especially desirable. Furthermore, compounds which contain group VIII atoms in the periodic table can be used conjointly in addition to the abovementioned metal compounds. The conjoint use of two or three species of iridium salts and iron salts is especially useful.

Water soluble iridium salts can be used as the iridium compounds of the present invention. Examples include iridium(III) halide compounds, and iridium(IV) halide compounds, and compounds in which halogen, amines, oxalate for example form ligands in iridium complex salts, for example hexachloroiridium (III) or (IV) complex salts, hexaamineiridium (III) or (IV) complex salts and trioxalatoiridium (III) or (IV) complex salts. In the present invention, the iridium (III) and iridium (IV) compounds from among these compounds can be used in any combination. These iridium compounds can be used by dissolution in water or a suitable solvent, but the methods frequently used for stabilizing solutions of iridium compounds, which is to say the methods in which aqueous hydrogen halide solutions (for example, hydrochloric acid, hydrobromic acid, hydrofluoric acid) or alkali halides (for example, KCl, NaCl, KBr, NaBr) are added, can be used. Separate silver halide grains which have been pre-doped with iridium during the preparation of the silver halide grains can also be added and dissolved instead of using water-soluble iridium compound.

The total amount of iridium compound added in the present invention is suitably from $1\times10^{-8}$ to $1\times10^{-6}$ mol, preferably from $5\times10^{-8}$ to $1\times10^{-6}$ mol, per mol of the silver halide which is formed ultimately. Desensitization occurs with the addition of more than $10^{-6}$ mol and this is undesirable.

The addition of iridium compounds can be made suitably at any stage during the preparation of the silver halide emulsion and before the emulsion is coated, but the addition during grain formation and incorporation within the silver halide grains are especially desirable.

Iridium(III) chloride, iridium(III) bromide, iridium(IV) chloride, and halogen, amine and oxalate complex salts such as hexachloroiridium(III) acid sodium salt, hexachloroiridium(III) salts, hexaamineiridium(IV) salts, trioxalatoiridium(III) salts, trioxalatoiridium(IV) salts and the like are preferred as compounds.

The known compounds can be used as the selenium sensitizers in the present invention. That is to say, in general, unstable type selenium compounds and/or non-unstable type selenium compounds are added and chemical sensitization is carried out by agitating for a fixed period of time at an elevated temperature of at least 40° C. The compounds disclosed, for example, in JP-B-44- 15748, JP-B-43-13489, and Japanese Patent Application Nos. 2-229300 and 3-121798 (corresponding to JP-A-4- 109240 and JP-A-4-324855, respectively), for example, can be used as unstable type selenium compounds. The use of the compounds in Japanese Patent Application No. 3-121798 is especially desirable.

The tellurium sensitizers used in the present invention are compounds which form silver telluride which is presumed to form sensitization nuclei at the surface of, or inside, the silver halide grains.

In practical terms, use can be made of the compounds disclosed in U.S. Pat. Nos. 1,623,499, 3,320,069 and 3,772,031, British Patents 235,211, 1,121,496, 1,295,462 and 1,396,696, Canadian Patent 800,958, Japanese Patent Application Nos. 2-333819, 3-53693 and 3-131598 (corresponding to JP-A-4-204640, JP-A-4-271341 and JP-A-4-333043, respectively) and Japanese Patent Application No. 4-129787, *J. Chem. Soc. Chem. Commun.*, 635 (1980), ibid, 1102 (1979), ibid, 645 (1979), *J. Chem. Soc. Perkin. Trans.*, 1, 2191 (1980), and (by S. Patai) in *The Chemistry of Organic Selenium and Tellurium Compounds*, Vol.1 (1986) and ibid, Vol.2 (1987).

The amount of selenium and tellurium sensitizers which is added varies according to the silver halide grain chemical ripening conditions which are used for example, but amounts on the order of from $10^{-8}$ to $10^{-2}$ mol, and preferably of from $10^{-7}$ to $10^{-3}$ mol, per mol of silver halide, are generally used.

No particular limitation is imposed on the chemical sensitization conditions in the present invention, but the pH is 5 to 8, the pAg is 6 to 11, and preferably 7 to 10, and the temperature is 40° to 95° C., and preferably 45° to 85° C.

Precious metal, such as gold, platinum, palladium and iridium, sensitizers are preferably used conjointly in the present invention. The conjoint use of gold sensitizers is especially desirable, and examples include chloroauric acid, potassium chloroaurate, potassium aurithiocyanate and gold sulfide. An amount on the order of from $10^{-7}$ to $10^{-2}$ mol per mol of silver halide can be used.

Moreover, the conjoint use of sulfur sensitizers is also desirable in this invention. The known unstable sulfur compounds such as thiosulfate (for example, hypo), thioureas (for example, diphenylthiourea, triethylthiourea, allylthiourea) and rhodanines can be cited in practice, and amounts on the order of from $10^{-7}$ to $10^{-2}$ mol per mol of silver halide can be used.

No particular limitation is imposed upon the various additives which can be used in the photosensitive materials and processing solutions of the present invention, and those disclosed in the locations indicated below can be used desirably.

| Item | Location |
| --- | --- |
| 1) Silver Halide Emulsions and Their Preparation | From line 12 of the lower right column of page 20 to line 14 of the lower left column of page 21 of JP-A-2-97937, from line 19 of the upper right column of page 7 to line 12 of the lower left column of page 8 of JP-A-2-12236, and the silver halide solvents disclosed in Japanese Patent Application No. 3-121798 (corresponding to JP-A-4-324855). |
| 2) Spectrally Sensitizing Dyes Which Can Be Used Conjointly | From line 8 of the upper left column of page 7 to line 8 of the lower right column of page 8 of JP-A-2-55349 and from line 8 of the lower right column of page 7 to line 5 of the lower right column of page 13 of JP-A-2-39042. |
| 3) Anti-foggants and Stabilizers | From line 19 of the lower right column of page 17 to line 4 of the upper right column of page 18, and from line 1 to line 5 of the lower right column of page 18, of JP-A-2-103536. The polyhydroxybenzenes disclosed from line 9 of the upper left column to line 17 of the lower right column of page 11 of JP-A-2-55349 is especially advantageous. |
| 4) Dyes | From line 1 to line 18 of the lower right column of page 17 of JP-A-2-103536 and from line 1 of the upper right column of page 4 to line 5 of the upper right column of page 6 of JP-A-2-39042. |
| 5) Hydrazine Nucleating Agents and Accelerators | From line 19 of the upper right column of page 2 to line 3 of the upper right column of page 7 of JP-A-2-12236, and from line 13 of the upper right column of page 9 to line 10 of the upper left column of page 16 of JP-A-2-103536. |
| 6) Surfactants and Antistatic Agents | From line 7 of the upper right column to line 7 of the lower right column of page 9 of JP-A-2-12236 and from line 13 of the lower left column of page 2 to line 18 of the lower right column of page 4 of JP-A-2-18542. |
| 7) Compounds which have Acid Groups | From line 6 of the lower right column of page 18 to line 1 of the upper left column of page 19 of JP-A-2-103536, and from line 13 of the lower right column of page 8 to line 8 of the upper left column of page 11 of JP-A-2-55349. |
| 8) Hardening Agents | From line 5 to line 17 of the upper right column of page 18 of JP-A-2-103536. |
| 9) Matting Agents, Lubricants, Plasticizers | From line 15 of the upper left column of page 19 to line 15 of the upper right column of page 19 of JP-A-2-103536. |
| 10) Polymer Latexes | From line 12 to line 20 of the lower left column of page 18 of JP-A-2-103536. |
| 11) Binders | From line 1 to line 20 of the lower right column of page 3 of JP-A-2-18542. |
| 12) Developers and Fixers | From line 16 of the upper right column of page 19 to line 8 of the upper left column of page 21 of JP-A-2-103536. |

The dyes are described more precisely below.

Colloidal silver and dyes can be used for anti-irradiation purposes, anti-halation purposes, and for ensuring stability to safe-lighting and the separation of the spectral sensitivity distribution of the photosensitive layers in particular, with the sensitizing dyes of the present invention.

Such dyes include, for example, the oxonol dyes which have a barbituric acid nucleus or a barbituric nucleus or a pyrazolone nucleus disclosed, for example, in U.S. Pat. Nos. 506,385, 1,177,429, 1,131,884, 1,338,799, 1,385,371, 1,467,214, 1,438,102 and 1,553,516, JP-A-48- 85130, JP-A-49-114420, JP-A-52-117123, JP-A-55-161233, JP-A-59-111640, JP-B-39-22069, JP-B-43-13168, JP-B-62- 273527 and U.S. Pat. Nos. 3,247,127, 3,469,985 and 4,078,933, the other oxonol dyes disclosed, for example, in U.S. Pat. Nos. 2,533,472 and 3,379,533, British Patent 1,278,621, JP-A-1-

134447 and JP-A-1-183652, the azo dyes disclosed, for example, in British Patents 575,691, 680,631, 599,623, 786,907, 907,125 and 1,045,609, U.S. Pat. No. 4,255,326 and JP-A-59-211043, the azomethine dyes disclosed, for example, in JP-A-50-100116, JP-A-54-118247 and British Patents 2,014,598 and 750,031, the anthraquinone dyes disclosed in U.S. Pat. No. 2,865,752, the arylidene dyes disclosed, for example, in U.S. Pat. Nos. 2,538,009, 2,688, 541 and 2,538,008, British Patents 584,609 and 1,210,252, JP-A-50-40625, JP-A-51-3623, JP-A- 51-10927, JP-A-54-118247, JP-B-48-3286 and JP-B-59- 37303, the styryl dyes disclosed, for example, in JP-B- 28-3082, JP-B-44-16594 and JP-B-59-28898, the triarylmethane dyes disclosed, for example, in British Patents 446,538 and 1,335,422, and JP-A-59-228250, the merocycanine dyes disclosed, for example, in British Patents 1,075,653, 1,153,341, 1,284,730, 1,475,228 and 1,542,807, and the cyanine dyes disclosed, for example, in U.S. Pat. Nos. 2,843,486 and 3,294,539, and JP-A-1-291247.

The methods indicated below can be cited for preventing the diffusion of these dyes. For example, the dye can be rendered fast to diffusion by the introduction of ballast groups.

Furthermore, for example, a method in which a dissociated anionic dye and a hydrophilic polymer which has the opposite charge as a mordant are present in the same layer and the dye is localized in the specified layer by the interaction with the dye molecule has been disclosed, for example, in U.S. Pat. Nos. 2,548,564, 4,124,386 and 3,625, 694.

Moreover, methods for dyeing a specified layer using dye solids which are insoluble in water has been disclosed, for example, in JP-A-56-12639, JP-A-55-155350, JP-A-55-155351, JP-A-63-27838, JP-A-63-197943 and European Patent 15601.

Furthermore, methods in which specified layers are dyed using fine particles of metal salts on which dye has been adsorbed have been disclosed, for example, in U.S. Pat. Nos. 2,719,088, 2,496,841 and 2,496,843, and JP-A-60-45237.

ILLUSTRATIVE EXAMPLES

Illustrative example are presented below in order to describe in more practical terms the details of the present invention, but the invention is not limited to these illustrative examples.

EXAMPLE 1

Solution 2-a and Solution 2-b indicated in Table 1 were added simultaneously over a period 16 minutes, with stirring, to Solution 1 which was being maintained at 38° C. and pH 4.5, and core grains were formed. Next, shells were formed by adding Solution 4-a and Solution 4-b over a period of 16 minutes, and then grain formation was completed by adding 0.15 grams of potassium iodide.

Subsequently, the emulsion was washed using a flocculation method in the usual way, and then 30 grams of gelatin were added. The pH was adjusted to 5.6, the pAg value was adjusted to 7.5, Compound (P), sodium thiosulfate and chloroauric acid were added and chemical sensitization was carried out at 60° C. in such a way that the maximum photographic speed was obtained. Moreover, 20 mg of 4-hydroxy-6-methyl-1,3,3a,7-tetrazaindene were added as a stabilizer and phenoxyethanol was added as a fungicide so that the concentration was 100 ppm, and the cubic silver iodochlorobromide grain Emulsion A of an average grain size 0.20 μm (variation coefficient 9%) which contained 80 mol % silver chloride was obtained ultimately.

Furthermore, Emulsion B was obtained in the same way as described above, except that the hexachloroiridium(III) acid potassium salt, was excluded from Solution 2-b.

TABLE 1

| Solution 1 | |
| --- | --- |
| Water | 1 liter |
| Gelatin | 20 grams |
| Sodium chloride | 2 grams |
| 1,3-dimethylimidazolidinone-2-thione | 20 mg |
| Sodium benzenethiosulfonate | 6 mg |
| Solution 2-a | |
| Water | 300 ml |
| Silver nitrate | 100 grams |
| Solution 2-b | |
| Water | 300 ml |
| Sodium chloride | 23 grams |
| Potassium bromide | 10 grams |
| Hexachloroiridium (III) acid potassium salt (0.001%) | 15 ml |
| Hexachlororhodium (III) acid ammonium salt (0.001%) | 10 ml |
| Solution 3-a | |
| Water | 300 ml |
| Silver nitrate | 100 grams |
| Solution 3-b | |
| Water | 300 ml |
| Sodium chloride | 23 grams |
| Potassium bromide | 10 grams |

Compound (P)

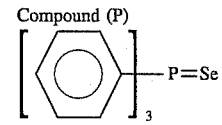

The sensitizing dyes shown in Table 7 were added (150 mg per mol of silver) to the emulsions so obtained. Moreover, 75 mg (per mol of silver) of 4,4'-bis[2,6-di( 2-naphthoxy)pyrimidin-4-ylamino)]stilbene-2,2'-disulfonic acid di-sodium salt were added as a supersensitizer, and 6 grams of hydroquinone and 25 mg of 1-phenyl- 5-mercaptotetrazole as a stabilizer were added.

Moreover, poly(ethyl acrylate) latex and 0.01 colloidal silica were added in amounts of 30% each with respect to the gelatin binder, and 70 mg/m$^2$ of 2-bis(vinylsulfonylacetamido)ethane were added as a hardening agent. The liquid was coated onto a polyester support in such a way that the coated silver weight was 3.2 g/m$^2$ and the coated weight of gelatin was 1.4 g/m$^2$. At this time the upper and lower protective layers the compositions of which are shown in Table 2 were coated simultaneously. Moreover, the BC layer and BC protective layer the compositions of which are shown in Table 3 were provided on the reverse side of the support.

TABLE 2

| | per m$^2$ |
| --- | --- |
| Lower Protective Layer | |
| Gelatin | 0.25 grams |
| Dye (D) | 250 mg |
| 1,5-Dihydroxy-2-benzaldoxime | 25 mg |
| 5-Chloro-8-hydroxyquinoline | 5 mg |

TABLE 2-continued

| | per m² |
|---|---|
| Poly(ethyl acrylate) latex | 160 mg |
| Sodium benzenethiosulfonate | 5 mg |
| α-Lipoic acid | 5 mg |
| Compound (E) | 5 mg |
| Compound (F) | 100 mg |
| Polyacrylamide of average molecular weight 5,000 | 500 mg |
| Upper Protective Layer | |
| Gelatin | 0.25 grams |
| Silica matting agent of average size 2.5 μm | 30 mg |
| Silicone oil | 100 mg |
| Colloidal silica of particle size 10 mμ | 30 mg |
| Compound (G) | 5 mg |
| Sodium dodecylbenzenesulfonate | 22 mg |

TABLE 3

| | per m² |
|---|---|
| BC Layer | |
| Gelatin | 0.25 grams |
| Sodium dodecylbenzenesulfonate | 20 mg |
| $SnO_2SbO_2$ (9/1) of average particle size 0.25 μm | 300 mg |
| BC Protective Layer | |
| Gelatin | 2.8 grams |
| Poly(methyl methacrylate) of average particle size 3.5 μm | 50 mg |
| Dye (H) | 35 mg |
| Dye (I) | 35 mg |
| Dye (J) | 120 mg |
| Sodium dodecylbenzenesulfonate | 90 mg |
| Compound (G) | 10 mg |
| 2-Bis(vinylsulfonylacetamido)ethane | 160 mg |

Dye (D)

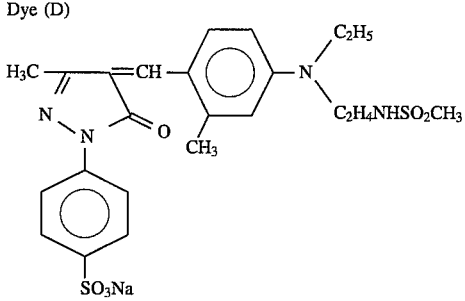

Compound (E)

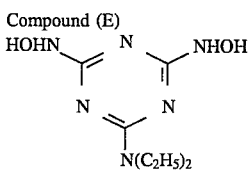

Compound (F)

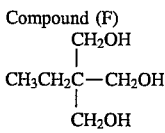

Compound (G)

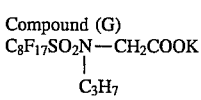

Dye (H)

TABLE 3-continued

| | per m² |
|---|---|

(chemical structures for Dye (H), Dye (I), Dye (J) shown)

Evaluation of Photographic Performance

The samples obtained were exposed through a continuous wedge and an interference filter which had a peak at 633 nm for an exposure time of $10^{-5}$ second using xenon flash light, processed under the conditions shown in Table 4 using a Fuji Photo Film Co., Ltd. automatic processor FG-710S, and then the samples were subjected to sensitometric measurements. A relative value of the reciprocal of the exposure which gave a density of 3.0 is shown as the relative speed for the photographic speed. Furthermore, the gradient of the straight line joining the points of density 0.1 and 3.0 is shown as the gradation.

TABLE 4

| FG-710S Process Times | | |
|---|---|---|
| Introduction | | 2 seconds |
| Development | 38° C. | 16 seconds |
| Fixing | 37° C. | 16 seconds |
| Water Washing | 26° C. | 9 seconds |
| Squeegee | | 3 seconds |
| Drying | 55° C | 15 seconds |
| TOTAL | | 61 seconds |

The developer and fixer used had the compositions shown in Tables 5 and 6.

TABLE 5

Developer Composition

| | |
|---|---|
| 1,2-Dihydroxybenzene-3,5-disulfonic acid sodium salt | 0.5 gram |
| Diethylenetriamine pentaacetic acid | 2.0 grams |
| Sodium carbonate | 5.0 grams |
| Boric acid | 10.0 grams |
| Potassium sulfite | 85.0 grams |
| Sodium bromide | 6.0 grams |
| Diethylene glycol | 40.0 grams |
| 5-Methylbenzotriazole | 0.2 gram |
| Hydroquinone | 30.0 grams |
| 4-Hydroxymethyl-4-methyl-1-phenyl-3-pyrazolidone | 1.6 grams |
| 2,3,5,6,7,8-hexahydro-2-thioxo-4-(1H)-quinazolinone | 0.05 gram |
| 2-Mercaptobenzimidazole-5-sulfonic acid sodium salt | 0.3 gram |

Potassium hydroxide was added, water was added to make up to 1 liter and pH was adjusted to 10.7.

TABLE 6

Fixer Composition

| | |
|---|---|
| Sodium thiosulfate (anhydrous) | 150 grams |
| Compound (K) | 0.1 mol |
| Sodium bisulfite | 30 grams |
| Ethylenediamine tetraacetic acid di-sodium salt, di-hydrate | 25 grams |

Sodium hydroxide was added, water was added to make up to 1 liter and pH was adjusted to 6.0

Compound (K)

$$\text{Me}-\underset{\underset{\text{Me}}{|}}{\overset{\oplus}{N}}\overset{Me}{\underset{}{\diagdown}}\underset{}{N-N}\overset{Me}{\diagup}\text{S}^{\ominus}$$

Furthermore, the samples obtained were stored for 3 days under conditions of 50° C., 70% relative humidity, and then the photographic speed was obtained in the same way as before.

The results obtained are shown in Table 7. The photographic speeds of the samples before ageing are shown as relative speeds taking Sample No. 1 as the standard for Sample Nos. 1 to 12 and Sample No. 13 as the standard for Sample Nos. 13 to 22.

Furthermore, the photographic speeds after storage for 3 days at 50° C., 70% RH are shown as relative values taking the speed of each sample before ageing to be 100.

From this date it is clear that the sensitizing dyes of the present invention provide a high photographic speed and a high contrast, and that the stability on storage is good. Furthermore, there is clearly a marked improvement with the iridium doped emulsion in particular. Furthermore, similar results were obtained when exposures were made using a He—Ne laser.

TABLE 7

| Sample No. | Emulsion | Sensitizing Dye | Before Ageing Photographic Speed | Gradation | Fog | 50° C.-70%-3 Days Photographic Speed | Gradation | Fog | Remarks |
|---|---|---|---|---|---|---|---|---|---|
| 1 | B | C-1 | 100 (Standard) | 6.0 | 0.06 | 76 | 5.9 | 0.06 | Comparative Example |
| 2 | B | I-1 | 105 | 6.2 | 0.05 | 83 | 6.2 | 0.05 | This Invention |
| 3 | B | I-2 | 105 | 6.2 | 0.05 | 83 | 6.2 | 0.05 | This Invention |
| 4 | B | I-3 | 110 | 6.2 | 0.05 | 85 | 6.2 | 0.05 | This Invention |
| 5 | B | I-4 | 123 | 6.2 | 0.05 | 87 | 6.2 | 0.05 | This Invention |
| 6 | B | I-5 | 123 | 6.3 | 0.05 | 87 | 6.3 | 0.05 | This Invention |
| 7 | A | C-1 | 141 | 7.5 | 0.05 | 78 | 7.4 | 0.05 | Comparative Example |
| 8 | A | I-1 | 145 | 7.7 | 0.05 | 83 | 7.7 | 0.05 | This Invention |
| 9 | A | I-2 | 151 | 7.7 | 0.05 | 85 | 7.7 | 0.05 | This Invention |
| 10 | A | I-3 | 151 | 7.8 | 0.05 | 91 | 7.8 | 0.05 | This Invention |
| 11 | A | C-4 | 170 | 7.7 | 0.05 | 93 | 7.7 | 0.05 | This Invention |
| 12 | A | I-5 | 170 | 7.7 | 0.05 | 93 | 7.7 | 0.05 | This Invention |
| 13 | B | C-2 | 100 (Standard) | 6.1 | 0.05 | 76 | 6.0 | 0.05 | Comparative Example |
| 14 | B | I-8 | 105 | 6.2 | 0.05 | 83 | 6.2 | 0.05 | This Invention |
| 15 | B | I-9 | 105 | 6.2 | 0.05 | 85 | 6.2 | 0.05 | This Invention |
| 16 | B | C-10 | 110 | 6.2 | 0.05 | 87 | 6.2 | 0.05 | This Invention |

TABLE 7-continued

| 17 | B | I-12 | 126 | 6.2 | 0.05 | 87 | 6.2 | 0.05 | This Invention |
| 18 | A | C-2 | 138 | 7.4 | 0.05 | 76 | 7.3 | 0.05 | Comparative Example |
| 19 | A | I-8 | 145 | 7.7 | 0.05 | 85 | 7.7 | 0.05 | This Invention |
| 20 | A | I-9 | 145 | 7.7 | 0.05 | 85 | 7.7 | 0.05 | This Invention |
| 21 | A | I-10 | 158 | 7.7 | 0.05 | 87 | 7.7 | 0.05 | This Invention |
| 22 | A | I-12 | 162 | 7.7 | 0.05 | 91 | 7.7 | 0.05 | This Invention |

C-1
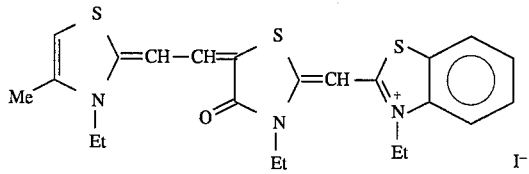

C-2
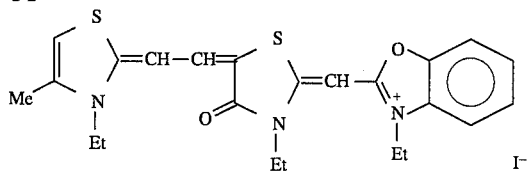

EXAMPLE 2

The results obtained after increasing the line speed of the automatic processor in Example 1 and setting the development time to 12 seconds are shown in Table 8.

It is clear from Table 8 that even after rapid processing, the samples of the present invention had a high photographic speed and high contrast.

TABLE 8

| Sample No. | Emulsion | Sensitizing Dye | Photographic Speed | Gradation | Fog | Remarks |
|---|---|---|---|---|---|---|
| 1 | B | C-1 | 96 | 5.8 | 0.06 | Comparative Example |
| 2 | B | I-1 | 105 | 6.2 | 0.05 | This Invention |
| 3 | B | I-2 | 104 | 6.2 | 0.05 | This Invention |
| 4 | B | I-3 | 110 | 6.2 | 0.05 | This Invention |
| 5 | B | I-4 | 123 | 6.2 | 0.05 | This Invention |
| 6 | B | I-5 | 123 | 6.3 | 0.05 | This Invention |
| 7 | A | C-1 | 138 | 7.4 | 0.05 | Comparative Example |
| 8 | A | I-1 | 145 | 7.7 | 0.05 | This Invention |
| 9 | A | I-2 | 151 | 7.7 | 0.05 | This Invention |
| 10 | A | I-3 | 150 | 7.8 | 0.05 | This Invention |
| 11 | A | I-4 | 169 | 7.7 | 0.05 | This Invention |
| 12 | A | I-5 | 170 | 7.7 | 0.05 | This Invention |
| 13 | B | C-2 | 96 | 6.0 | 0.05 | Comparative Example |
| 14 | B | I-8 | 105 | 6.2 | 0.05 | This Invention |
| 15 | B | I-9 | 105 | 6.2 | 0.05 | This Invention |
| 16 | B | I-10 | 110 | 6.2 | 0.05 | This Invention |

TABLE 8-continued

| Sample No. | Emulsion | Sensitizing Dye | Photographic Speed | Gradation | Fog | Remarks |
|---|---|---|---|---|---|---|
| 17 | B | I-12 | 126 | 6.2 | 0.05 | This Invention |
| 18 | A | C-2 | 132 | 7.3 | 0.05 | Comparative Example |
| 19 | A | I-8 | 144 | 7.7 | 0.05 | This Invention |
| 20 | A | I-9 | 145 | 7.7 | 0.05 | This Invention |
| 21 | A | I-10 | 158 | 7.7 | 0.05 | This Invention |
| 22 | A | I-12 | 162 | 7.7 | 0.05 | This Invention |

EXAMPLE 3

A running test using the automatic processor FG-710S used for the evaluation of photographic speed was carried out with 150 m² of film. A silver chlorobromide emulsion of a silver chloride content 70 mol % per mol of silver had been coated on the film at a coated silver weight of 3.6 g/m² with 50% blackening, and the replenishment of the developer and fixer was at the rate of 180 cc/m² with the bath solutions of developer and fixer. The samples of Example 1 were then processed using these liquids, the photographic speed and the gradation were evaluated and the differences from those when fresh solutions had been used were evaluated. Fixation was also evaluated at this time. The results are shown in Table 9.

It is clear from Table 9 that the samples of the present invention exhibited stable photographic performance even at low replenishment rates with both normal processing and rapid processing.

TABLE 9

| | | | 12" Development | | | 16" Development | | | |
|---|---|---|---|---|---|---|---|---|---|
| Sample No. | Emulsion | Sensitizing Dye | Photographic Speed | Gradation | Fixation | Photographic Speed | Gradation | Fixation | Remarks |
| 1 | B | C-1 | 4 | 0.3 | Poor | 4 | 0.2 | Poor | Comparative Example |
| 2 | B | I-1 | 2 | 0.1 | Good | 2 | 0.1 | Good | This Invention |
| 3 | B | I-2 | 2 | 0.1 | Good | 0 | 0 | Good | This Invention |
| 4 | B | I-3 | 2 | 0.1 | Good | 0 | 0 | Good | This Invention |
| 5 | B | I-4 | 2 | 0.1 | Good | 0 | 0 | Good | This Invention |
| 6 | B | I-5 | 0 | 0.1 | Good | 0 | 0 | Good | This Invention |
| 7 | A | C-1 | 4 | 0.1 | Good | 2 | 0.2 | Good | Comparative Example |
| 8 | A | I-1 | 2 | 0.1 | Good | 2 | 0.1 | Good | This Invention |
| 9 | A | I-2 | 2 | 0.1 | Good | 0 | 0 | Good | This Invention |
| 10 | A | I-3 | 2 | 0.1 | Good | 0 | 0 | Good | This Invention |
| 11 | A | I-4 | 2 | 0.1 | Good | 0 | 0 | Good | This Invention |
| 12 | A | I-5 | 0 | 0.1 | Good | 0 | 0 | Good | This Invention |
| 13 | B | C-2 | 4 | 0.3 | Good | 2 | 0.2 | Good | Comparative Example |
| 14 | B | I-8 | 2 | 0.1 | Good | 0 | 0 | Good | This Invention |
| 15 | B | I-9 | 2 | 0.1 | Good | 0 | 0 | Good | This Invention |
| 16 | B | I-10 | 2 | 0.1 | Good | 0 | 0 | Good | This Invention |
| 17 | B | I-12 | 0 | 0.1 | Good | 0 | 0 | Good | This Invention |
| 18 | A | C-2 | 4 | 0.4 | Good | 2 | 0.2 | Good | Comparative Example |
| 19 | A | I-8 | 2 | 0.1 | Good | 0 | 0 | Good | This Invention |
| 20 | A | I-9 | 2 | 0.1 | Good | 0 | 0 | Good | This Invention |
| 21 | A | I-10 | 0 | 0.1 | Good | 0 | 0 | Good | This |

TABLE 9-continued

| Sample No. | Emulsion | Sensitizing Dye | 12" Development | | | 16" Development | | | Remarks |
|---|---|---|---|---|---|---|---|---|---|
| | | | Photographic Speed | Gradation | Fixation | Photographic Speed | Gradation | Fixation | |
| 22 | A | I-12 | 0 | 0.1 | Good | 0 | 0 | Good | Invention This Invention |

Silver halide photographic photosensitive materials which contain sensitizing dyes which have the specified structure of formula (I) have a high photographic speed and high contrast and excellent keeping quality. Moreover, they exhibit good performance in rapid processing and in low replenishment processing.

While the invention has been described in detail and with reference to specific embodiments thereof, it will be apparent to one skilled in the art that various changes and modifications can be made therein without departing from the spirit and scope thereof.

What is claimed is:

1. A silver halide photographic photosensitive material which comprises a silver halide photographic emulsion layer and at least one compound represented by the following general formula (I):

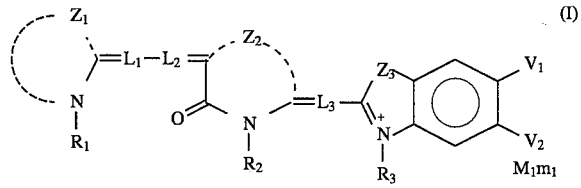

wherein $V_1$ and $V_2$ each represents the same group and is an alkyl group or an alkoxy group; $Z_1$ represents a group of atoms which is required to form a thiazole nucleus; $Z_2$ represents a group of atoms which is required to form a five- or six-membered nitrogen-containing heterocyclic ring; $Z_3$ represents an oxygen atom, a sulfur atom or a selenium atom; $R_1$ and $R_3$ each represents an alkyl group; $R_2$ represents an alkyl group, an aryl group or a heterocyclic group; $L_1$, $L_2$ and $L_3$ each represents a methine group; $M_1$ represents a charge neutralizing counter-ion; and $m_1$ is a number having a value zero or above which is required to neutralize the charge within the molecule.

2. The silver halide photographic photosensitive material as in claim 1, wherein the silver halide photographic emulsion contains an iridium compound.

3. The silver halide photographic photosensitive material as in claim 1, wherein the nucleus formed by $Z_2$ is a 3-alkylrhodanine, 3-alkyl-2-thiooxazolidin-2,4-dione or 3-alkyl-2-thiohydantoin nucleus.

4. The silver halide photographic photosensitive material as in claim 1, wherein both $V_1$ and $V_2$ are an unsubstituted methyl group.

5. The silver halide photographic photosensitive material as in claim 1, wherein both $V_1$ and $V_2$ are an unsubstituted methoxy group.

6. The silver halide photographic photosensitive material as in claim 1, wherein the material has been subjected to selenium and/or tellurium sensitization.

7. The silver halide photographic photosensitive material as in claim 1, wherein the amount of said compound according to Formula (I) in said photosensitive material is from $4 \times 10^{-8}$ mol to $8 \times 10^{-2}$ mol per mol of silver halide in said silver halide photographic emulsion layer.

* * * * *